US009137029B1

(12) United States Patent
Vasquez et al.

(10) Patent No.: US 9,137,029 B1
(45) Date of Patent: Sep. 15, 2015

(54) STATE AND AVAILABILITY MONITORING FOR CUSTOMER SUPPORT SERVICES FOR MULTIMEDIA CONFERENCES

(75) Inventors: Juan Vasquez, Mountain View, CA (US); Steve Osborn, Mountain View, CA (US)

(73) Assignee: Google Inc., Mountain View, CA (US)

( * ) Notice: Subject to any disclaimer, the term of this patent is extended or adjusted under 35 U.S.C. 154(b) by 769 days.

(21) Appl. No.: 13/424,098

(22) Filed: Mar. 19, 2012

(51) Int. Cl.
*H04L 12/66* (2006.01)
*H04L 12/18* (2006.01)

(52) U.S. Cl.
CPC .......... *H04L 12/1818* (2013.01); *H04L 12/185* (2013.01)

(58) Field of Classification Search
CPC .......................... H04L 12/1818; H04L 12/185
USPC .......................................................... 370/352
See application file for complete search history.

(56) References Cited

U.S. PATENT DOCUMENTS

| 5,854,893 | A | 12/1998 | Ludwig et al. |
|---|---|---|---|
| 6,237,025 | B1 | 5/2001 | Ludwig et al. |
| 7,054,904 | B2 | 5/2006 | Ludwig et al. |
| 7,185,054 | B1 | 2/2007 | Ludwig et al. |
| 7,206,809 | B2 | 4/2007 | Ludwig et al. |
| 7,711,095 | B2 | 5/2010 | Erhart et al. |
| 7,769,148 | B2 | 8/2010 | Erhart et al. |
| 7,778,397 | B2 | 8/2010 | Erhart et al. |
| 2002/0073208 | A1* | 6/2002 | Wilcock et al. ............... 709/227 |
| 2003/0059021 | A1 | 3/2003 | Meyerson et al. |
| 2003/0202088 | A1 | 10/2003 | Knight |
| 2004/0119814 | A1 | 6/2004 | Clisham et al. |
| 2006/0285662 | A1 | 12/2006 | Yin et al. |
| 2008/0123839 | A1* | 5/2008 | McCormack et al. ... 379/265.02 |
| 2009/0287790 | A1 | 11/2009 | Upton et al. |
| 2010/0064334 | A1 | 3/2010 | Blackburn et al. |
| 2011/0249081 | A1 | 10/2011 | Kay et al. |
| 2011/0261144 | A1 | 10/2011 | Benefield et al. |

* cited by examiner

*Primary Examiner* — Sai-Ming Chan
(74) *Attorney, Agent, or Firm* — Leydig, Voit & Mayer, Ltd.

(57) ABSTRACT

A system and method are described for providing support services via a virtual production environment. The system may include a help center interface, an agent interface, and a communications server running in association with a contact center manager application. The system may further include a reflector. The contact center manager application matches customers with suitable agents in the virtual production environment in the context of providing customer support in response to customer support requests. The method may include transmitting a customer support request to the contact center manager application, wherein a determination of whether a suitable agent is available is made by the contact center manager application; and connecting to a communications session corresponding to a session address provided by the contact center manager application for the customer device based on the determination.

20 Claims, 8 Drawing Sheets

STATE AND AVAILABILITY MONITORING FOR CUSTOMER SUPPORT SERVICES FOR MULTIMEDIA CONFERENCES

BACKGROUND

Face-to-face or in-person interactions among groups of individuals allow each individual to observe the behavior, mood, expressions, tone and the like of the other individuals in the group not discernable from voice interaction alone. The human experience of direct interaction is always preferable to interaction at a distance that limits communications.

Additionally, group interaction facilitates relationship building by the creation of shared experiences. Traditionally, group interaction that builds relationships within the group was restricted to face-to-face meetings of the group. Of course, groups have long been able to meet and interact when separated physically using telephony technology. More recently, group meetings involving participants at remote locations have been enhanced with the addition of live video feeds of the participants. Both personal computers (PCs) and personal digital assistants (PDAs) are now commonly equipped with both microphones and video cameras that provide the basic resources for creating a shared multimedia session among a group of individuals with PCs and/or smart phones. These devices rely on Internet-based communication protocols such as "Voice over IP" (VoIP).

Meanwhile, conventional agent support systems continue to provide technical support for users of these rapidly evolving multimedia communications environments. Managing agent resources outside of the environment of the multimedia communications environment makes for inefficiencies and possibly even requests for assistance that are ignored.

SUMMARY

According to an embodiment, a system for providing support services via a virtual production environment includes: a help center interface connected to one or more customer devices configured to receive customer support requests from the one or more customer devices and to communicate with a contact center manager (CCM) application; an agent interface connected to one or more agent devices configured to communicate agent availability information to the CCM application; and a communications server running in association with the CCM application. The CCM application is configured to provide a session address to the one or more customer devices and the one or more agent devices and to match the one or more customer devices with the one or more agent devices based on the agent availability information and matching rules. The communications server is configured to maintain a communications session between the one or more customer devices and the one or more agent devices based on matching by the CCM application.

In a further embodiment, the CCM application is further configured to provide an unmatched customer device or unmatched agent device with a new session address so as to connect the unmatched customer device or the unmatched agent device to a new communications session. A new multimedia communications session may be an ambient multimedia communications session until a matched customer device or a matched agent device is connected to the new communications session. In another embodiment, the help center interface is further configured to receive information specifying one or more customer support request categories, and the matching rules include an agent skill map that maps skills of agent to the one or more customer support request categories.

According to another embodiment, a system for providing support services via a multimedia production environment includes: one or more agent devices, for communicating with a communications server using voice over internet protocol (VoIP) and sending and receiving multimedia content; a reflector, for receiving multimedia content from the one or more agent devices and one or more customer devices, processing the received multimedia content, and sending a plurality of processed multimedia streams for playback at the one or more agent devices and the one or more customer devices; and a contact center manager (CCM) application running on the communications server. The CCM application receives customer support requests from the one or more customer devices, providing a session address to the one or more customer devices and the one or more agent devices, and matching the one or more customer devices with the one or more agent devices based on agent availability information and matching rules.

According to yet another embodiment, a method for receiving support services via a multimedia production environment includes: transmitting a customer support request to a contact center manager application, wherein a determination of whether a suitable agent is available is made by the contact center manager application based on customer support request information, agent availability information, and matching rules; and connecting to a communications session corresponding to a session address provided by the contact center manager application for a customer device based on the determination. The multimedia production environment includes a contact center manager application, and the method is performed at the customer device.

DETAILED DESCRIPTION

A multimedia production environment provides a mechanism for two or more individuals to interact in the same virtual location, which may be described as a "virtual hangout." A virtual hangout supports multiple users, using diverse communication tools, to interact, collaborate, and/or share information and experiences in the same virtual environment. In an Internet environment, the virtual hangout is hosted by one or more servers that support communications sessions with user machines equipped with resources such as microphones and video cameras. For example, individuals participating in a virtual hangout may share and watch videos, play games, participate in video, audio, or text chat, surf the web, seek or provide assistance regarding a particular problem, or any combination thereof. In other words, a virtual hangout is where individuals may share an experience substantially similar to interacting face-to-face or in person at the same physical location.

When an individual desires to interact with a group of others in a virtual environment, the individual employs a client device to either initiate a virtual hangout session or join an existing virtual hangout session. When establishing a new virtual hangout session, the individual invites others to join the session. Typically, to join an existing virtual hangout session, each participant must be invited. Invitations arrive via e-mail or text messaging services. An individual can request joining an existing hangout session even though he or she has not received an invitation, assuming the URL for the session is known. Additionally, individuals participating in a virtual hangout session may cause the session to link to external resources and integrate those external resources into the participates' graphical user interfaces (GUI).

In an embodiment, management of technical support services and agents who provide those services is brought into the realm of the multimedia production environment (i.e., via virtual hangouts), which enables the environment to manage overall support resources and most efficiently match and join these resources to requests for assistance. Using the multimedia production environment, customers requesting assistance and agents providing assistance are efficiently matched up with one another in the multimedia production environment and able to leverage the advantages of the multimedia production environment over conventional agent support systems.

An example multimedia production environment is described in detail with respect to FIGS. 1-5. The illustrated environment is presented as an example, and does not imply any limitation regarding the use of other group networking environments to practice the disclosure. To the contrary, the description contemplates all implementations of multimedia production environments that include agent support services within the environment.

Figure 1:
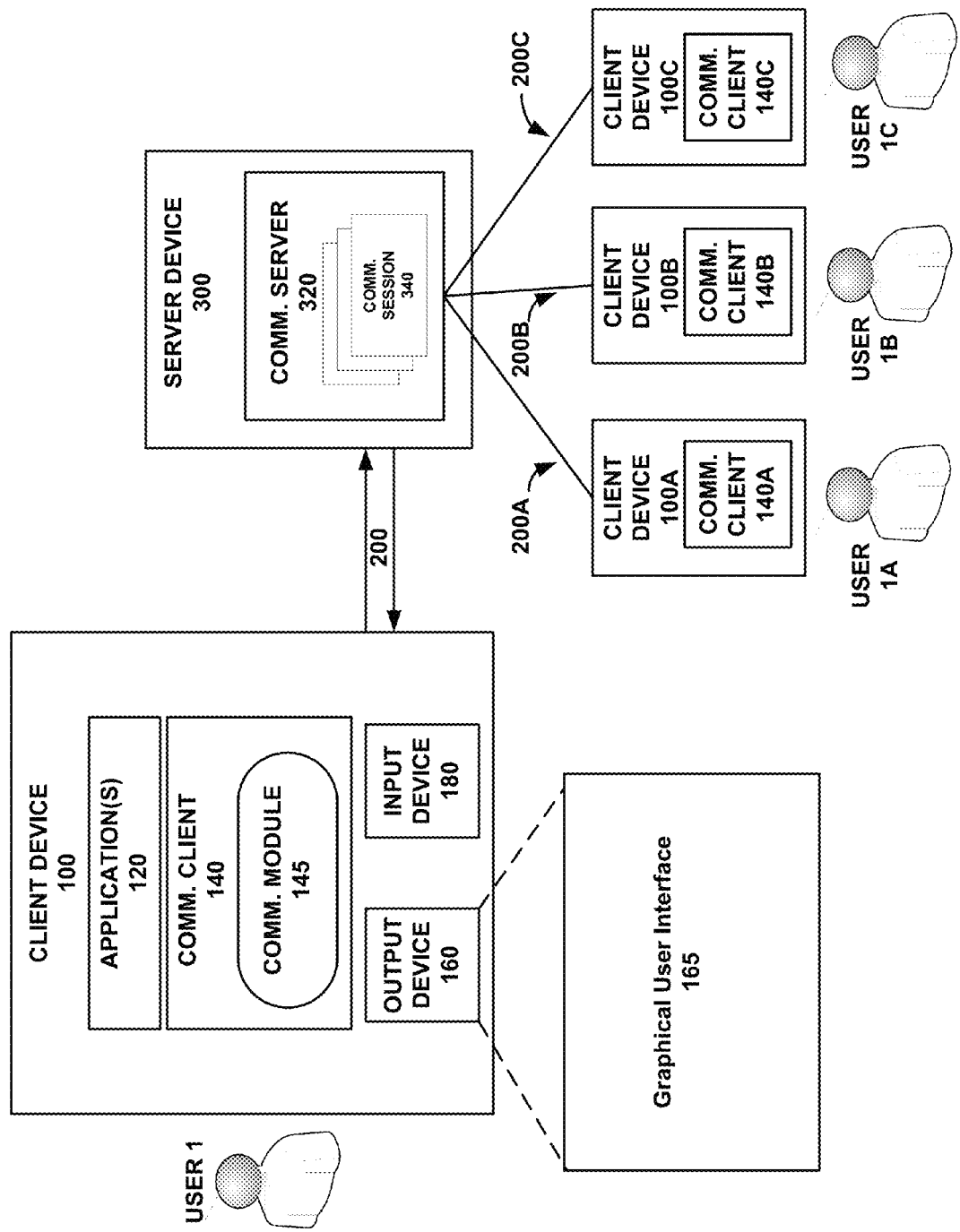
FIG. 1 is a block diagram of an example system supporting a multimedia production environment, including a plurality of client machines interacting through a common communications session hosted by a server resource.

Turning to FIG. 1, one or more client devices are connected to a communications session supporting a multimedia production environment that enables communication among the users of the client devices. Examples of client devices 100 and 100A-C include, but are not limited to, portable, mobile, and/or stationary devices such as landline telephones, mobile telephones (including "smart phones"), laptop computers, tablet computers, desktop computers, personal digital assistants (PDAs), portable gaming devices, portable media players, and e-book readers. In some embodiments, two or more client devices are the same type of device. For example, client devices 100 and 100A may both be mobile telephones. In other embodiments, two or more client devices are different types of devices. For example, client devices 100 and 100A may both be mobile telephones and client device 100B may be a desktop computer.

In the embodiment illustrated by FIG. 1, the client device 100 communicates with a server device 300 via a communications channel 200. The communications channel typically includes an Internet connection between the client device 100 and the server device 300. The server device 300 often comprises multiple physical servers such as a communications server 320 for maintaining or "hosting" one or more communications sessions, such as communications session 340. Of course, each server can be a physically separate machine or it can be different processes running within the same physical machine.

One or more of the communications sessions are virtual hangouts. In another embodiment, the client device 100 maintains or hosts a communications session and other client devices such as client devices 100A-C in FIG. 1 are routed to the communications session at the client device 100 by server device 300 or directly connect to the client device 100 via an ad-hoc network or the like. Additionally, while depicted as a single device in FIG. 1, in some embodiments server device 300 includes a plurality of interconnected devices maintained at different physical locations.

Communications or hangout sessions 340 at the communications server 320 are supported by an environment defined by a runtime engine executing at the server. For example, the run time engine may be Google's "App Engine." The runtime engine provides the platform for the hangout session and supplies resources required for user interaction. The resources of the application engine are available to the hangout session by way of an application programming interface (API).

The client device 100 of FIG. 1 includes application(s) 120, communications client 140, output device 160 (e.g., a display), and input device 180 (e.g., keyboard, mouse, touch screen). Application(s) 120 provide the client device 100 with a variety of functionality. Examples include social media functionality, web browsing capabilities, calendars, contact information, games and document processing. Generally, application(s) 120 employ the output device 160 to display information at a graphical user interface (GUI) 165.

The communications client 140 further includes a communications module 145 that enables output device 160 to display information at the GUI 165. The communications module 145 also enables the communications client 140 to connect to the communications server 320, allowing user 1 in FIG. 1 to establish or join a hangout session. Typically, the communications module 145 is a network module that connects the client device 100 to a network such as the Internet using standard network protocol techniques. Two or more client devices 100 and 100A may join the same communications session 340 hosted at the communications server 320. Through the communications session 340, the communications module 145 at the client device 100 enables the user 1 to invite other users to the join the session.

Once a communications session 340 is established, a communications channel 200 between the communications client 140 and the communications server 320 exchanges data, such as audio, video, text, and/or other information. In some embodiments, the data exchanged between the communications client 140 and the communications server 320 is optimized based, at least in part, on the hardware and/or software capabilities of client device 100. For example, if the client device 100 is a mobile device connecting through to the communications session 340 by way of a bandwidth limited path such as a cellular network, communications server 320 may optimize the number and quality of the audio, video, text, and/or other information sent to client device 100. Furthermore, communications client 140 may dynamically adjust the bit rate required to send the information to communications server 320 by, for example, reducing the quality of the audio, video, text, and/or other information being sent to communications server 320.

GUI 165 is an illustrative example of a GUI from which a virtual hangout may be initiated and sustained. In the illustrated embodiment, GUI 165 includes information about one or more other users connected to user 1 by the communications session 340. The GUI may also include information about other hangouts user 1 may join, notifications of events or invitations and other information relevant to user 1.

After a communications session 340 or hangout is created by a user, other users may join following a request-approve process. For example, user 1 may send a request to user 1A requesting to be connected to user 1A's hangout session. In order to complete the request, user 1A chooses to either accept or deny the request. Upon accepting the request, communications session 340 connects user 1 into the hangout session initiated by user 1A. In some instances, user 1A grants permission to user 1 to view personal information entered by user 1A, posts created by user 1A, or other users connected to user 1A.

The GUI may also support the ability to broadcast the availability of a session or hangout to a circle of friends defined by each user. The GUI of each friend identifies the available hangout session and the client includes URL information that allows the user to join the hangout if desired. Each client may include multiple circles of friends with each defined by social attributes. For example, one circle of friends may include friends established from a common working relationship. Another circle of friends may include friends established from familial relationships. Another circle of friends could include friends established from a common educational background or experience. The GUI supports invitations to individuals or to one or ore circles of friends.

Also, each circle of friends may be associated with a different profile of permissions or privileges through the GUI such that the circle is able to view a different subset of information about the user. A friend can be included in more than one circle. In that case, the GUI allows the user to determine whether the broadest or narrowest set of permissions or privileges of the circles to which the friend belongs are given to the individual friend.

As shown in FIG. 1, client devices 100A-C include communications clients 140A-C, respectively, that enable users 1A-C to join one or more of the hangouts or communications sessions 340. Each of the communications clients 140A-C includes the same or similar functionality as the communications client 140.

In order to establish or join a virtual hangout, user 1 interacts with GUI 165 to cause communications client 140 to generate a request to create a new communications session 340 or join an existing communications session 340. For example, GUI 165 includes a "Create Hangout" button that user 1 activates in order to create a new hangout. In response to user 1 activating the Create Hangout button, communications client 140 sends a request to initiate a new communications session 340 to communications server 320, which establishes a new virtual hangout.

User 1 may invite additional users to the hangout session, such as users 1A-C in FIG. 1, while the virtual hangout is being instantiated or anytime thereafter. At the GUI 165, user 1 selects individual friends or one or more different circles of friends to join the hangout. The selected friends are sent invitations via various conventional means such as text messaging and e-mail. The invitations include all information required for the invited friend to find and join the hangout session.

For example, to join an existing hangout or communications session 340, the user 1 selects a "join link" icon at the GUI 165 and selects a hangout from a displayed list of available hangouts at the GUI or selects a "join link" icon displayed in an external source such as an instant message or posting. However communicated to the user, in response to user 1 initiating an attempt to join an existing virtual hangout session, communications client 140 sends a request to join the virtual hangout to the communications server 320. The request includes an identifier of the particular communications session 340 associated with the virtual hangout. The identifier may be included in the join link for the virtual hangout. Communications server 320 connects communications client 140 to the specified communications session 340. In another example, a user 1 that is logged into a website may join an existing or new hangout by pressing a button or link on a web page, such as a customer support center landing page. As will be described further below, in the customer support context, such landing page may include input fields for specifying the type of help that the user 1 is seeking.

Figure 2:
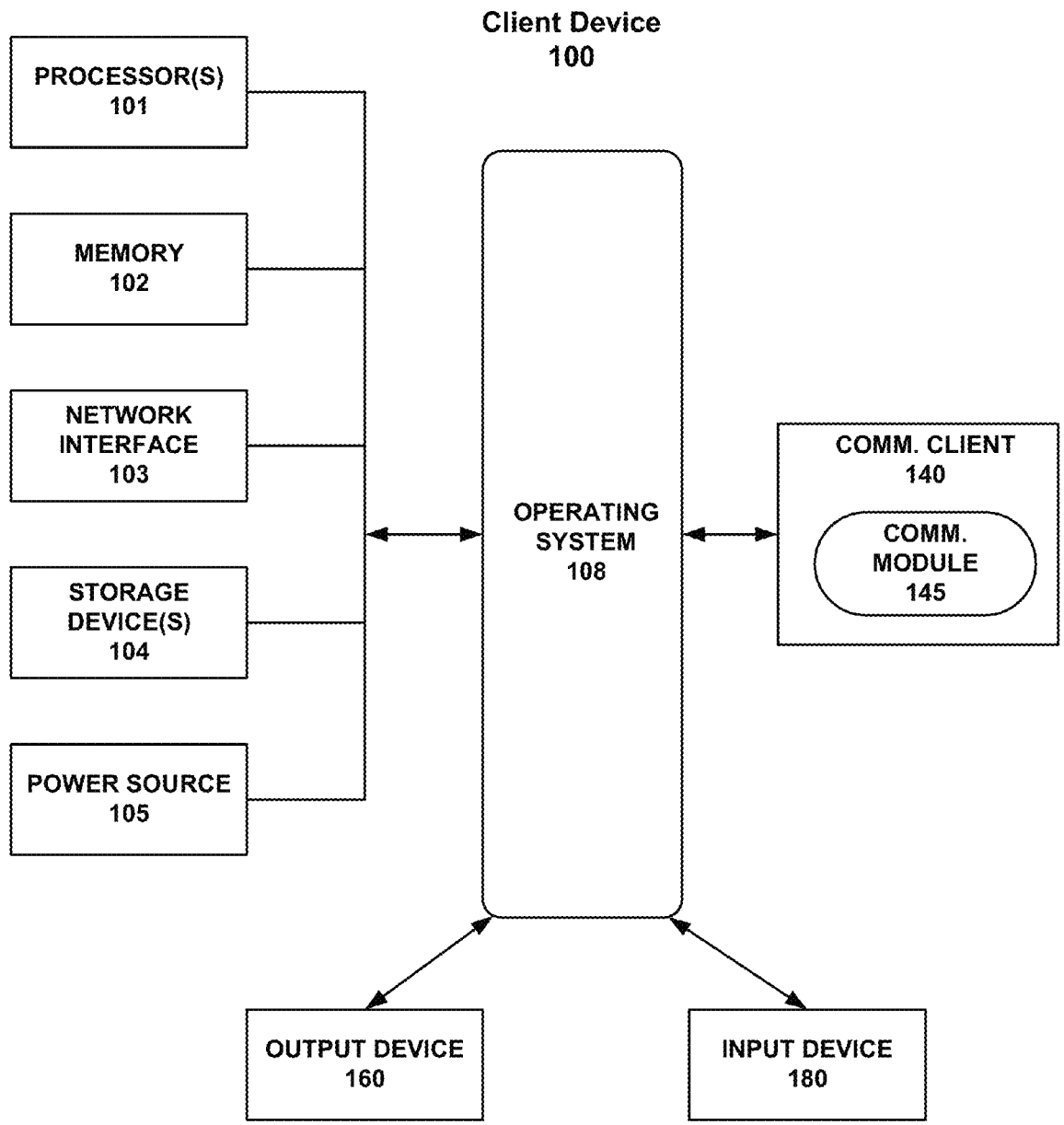
FIG. 2 is a block diagram of basic functional components for one of the client machines in FIG. 1.

Referring now to FIG. 2, one particular example of client device 100 is illustrated. In general, many other embodiments of the client device 100 may be used as long as they support at least limited participation in the hangout sessions. In the illustrated embodiment of FIG. 2, the client device 100 includes one or more processors 101, memory 102, a network interface 103, one or more storage devices 104, power source 105, output device 160, and input device 180. The client device 100 also includes an operating system 108 and a communications client 140 that are executable by the client. In a conventional fashion, each of components 101, 102, 103, 104, 105, 160, 180, 108, and 140 are interconnected physically, communicatively, and/or operatively for inter-component communications.

As illustrated, processors 101 are configured to implement functionality and/or process instructions for execution within client device 100. For example, processors 101 execute instructions stored in memory 102 or instructions stored on storage devices 104. Memory 102, which may be a non-transient, computer-readable storage medium, is configured to store information within client device 100 during operation. In some embodiments, memory 102 includes a temporary memory, area for information not to be maintained when the client device 100 is turned off. Examples of such temporary memory include volatile memories such as random access memories (RAM), dynamic random access memories (DRAM), and static random access memories (SRAM). Memory 102 is maintains program instructions for execution by the processors 101.

Storage devices 104 also include one or more non-transient computer-readable storage media. Storage devices 104 are generally configured to store larger amounts of information than memory 102. Storage devices 104 may further be configured for long-term storage of information. In some examples, storage devices 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 100 uses network interface 103 to communicate with external devices via one or more networks, such as one or more wireless networks. Network interface 103 may be a network interface card, such as an Ethernet card, an optical transceiver, a radio frequency transceiver, or any other type of device that can send and receive information. Other non-limiting examples of network interfaces include Bluetooth®, 3G and WiFi® radios in mobile computing devices, and USB. In some embodiments, the client device 100 uses network interface 103 to wirelessly communicate with an external device such as the server device 300 of FIG. 1, a mobile phone, or other networked computing device.

The client device 100 includes one or more input devices 180. Input device 180 is configured to receive input from a user through tactile, audio, and/or video feedback. Non-limiting examples of input device 180 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 160 are also included in client device 100. Output device 160 is configured to provide output to a user using tactile, audio, and/or video stimuli. Output device 160 may include a display screen (part of the presence-sensitive screen), a sound card, a video graphics adapter card, or any other type of device for converting a signal into an appropriate form understandable to humans or machines. Additional examples of output device 160 include a speaker, a cathode ray tube (CRT) monitor, a liquid crystal display (LCD), or any other type of device that can generate intelligible output to a user.

The client device 100 includes one or more power sources 105 to provide power to the client. Non-limiting examples of power source 105 include single-use power sources, rechargeable power sources, and/or power sources developed from nickel-cadmium, lithium-ion, or other suitable material.

The client device 100 includes an operating system 108 such as the Android® operating system. The operating system 108 controls operations of the components of the client device 100. For example, the operating system 108 facilitates the interaction of communications client 140 with processors 101, memory 102, network interface 103, storage device(s) 104, input device 180, output device 160, and power source 105. As illustrated in FIG. 2, communications client 140 includes communications module 145. Each of communications client 140 and communications module 145 typically includes program instructions and/or data that are executable by the client device 100. For example, in one embodiment communications module 145 includes instructions causing the communications client 140 executing on the client device 100 to perform one or more of the operations and actions described in the present disclosure.

In some embodiments, communications client 140 and/or communications module 145 form a part of operating system 108 executing on the client device 100. In other embodiments, communications client 140 receives input form one or more of the input devices 180 of the client device 100. Communications client 140 preferably receives audio and video information associated with a communications session 340 (e.g., a virtual hangout) from other client devices participating in the communications session.

Figure 3:
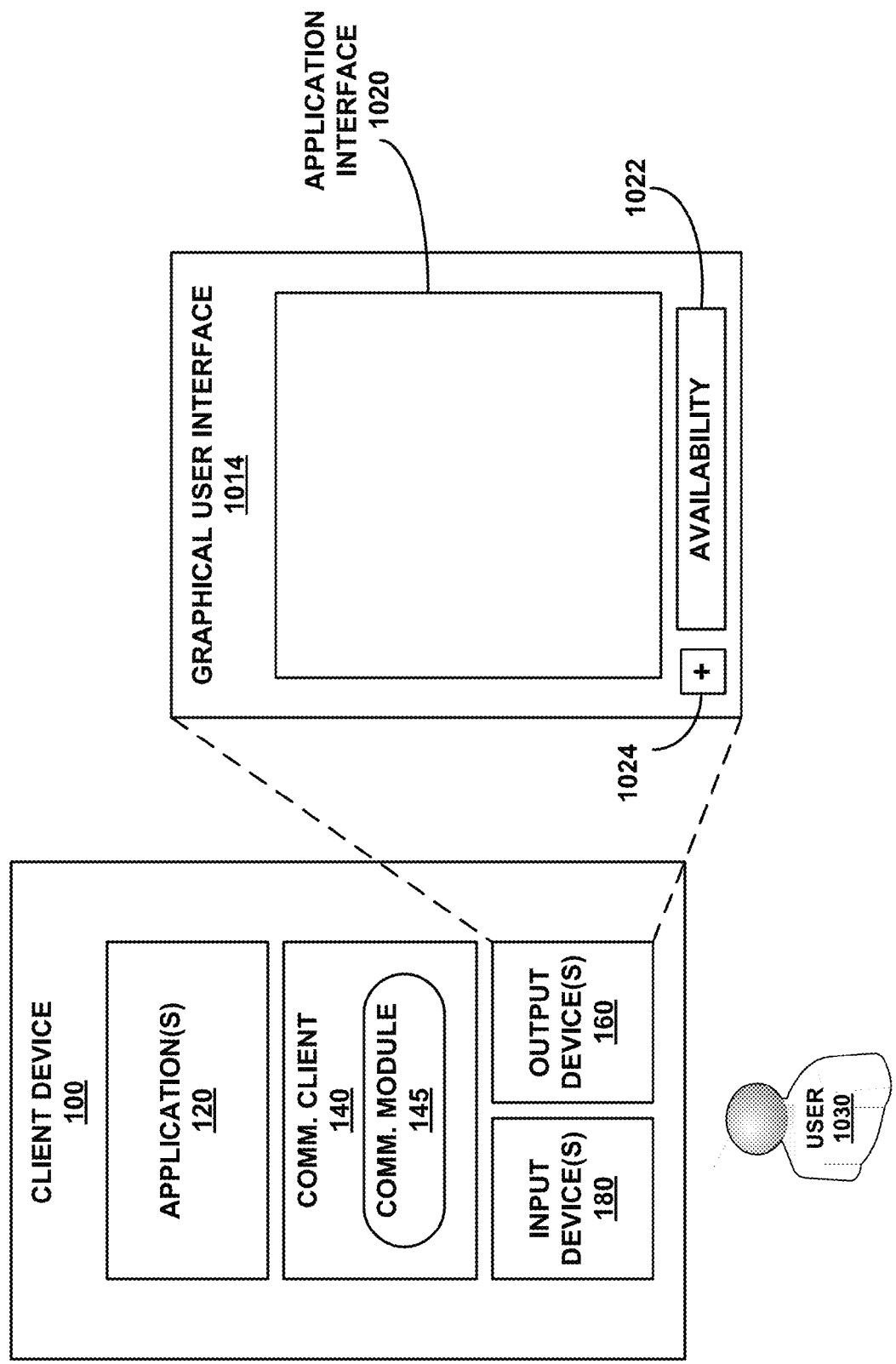
FIG. 3 is an application level block diagram of the client machine in FIG. 2, illustrating example executable components supporting group interaction experiences within the multimedia production environment.

FIG. 3 illustrates an example configuration of the client device 100 when it creates an ambient communications session—e.g., an ambient hangout. An ambient hangout is a hangout that is inactive—i.e., a hangout session without any other users. In some instances, an ambient hangout provides only a subset of the functionality, features, or aspects as compared with an "active" hangout—i.e., a hangout session in which at least one other user is connected. In one example, a hangout that is partially initiated is an ambient hangout.

The communications client 140 initiates a hangout session from the client device 100 and maintains the session with the communications session 340 at the communications server 320 while the client performs other tasks. Once one or more other users join the hangout session, the application engine at the communications server 320 may provide additional services to the session that supports interaction among users.

The client device 100 can maintain one or more ambient hangouts in its background. By maintaining the ambient hangouts in its background, the client device 100 saves computing resources including power, bandwidth, processor speed, memory and the like. While a hangout is ambient, user 1 is able to use other features or applications of the client device 100, such as application(s) 120. As shown in FIG. 3, GUI 165 displays application interface 1650. Application interface 1650 allows user 1 to use and interact with application(s) 120, which in one embodiment can be a internet browser such as Internet Explorer®. For example, while client device 100 maintains an ambient hangout in its background, user 1 may interact with application interface 1650 to view social media, browse the web, view a calendar and/or contacts, play games, process documents, or any other function performed by a computing device such as client device 100. In some examples, application interface 1650 is a graphical display that is not interactive.

The communications client 140 causes GUI 165 to display a user-selectable button 1652. Non-limiting examples of the button 1652 are a virtual or graphical button, such as a key of a virtual keyboard, a touch-target, a physical button of client device 100, or a button on an input device 180 coupled to client device 100, such as a mouse button, a button on a mobile device, or a key of a keyboard. Of course, GUI 165 may include other graphical controls as well.

In FIG. 3, communications client 140 is also configured to cause GUI 165 to display an availability indication 1651. The availability indication 1651 indicates to individual friends and/or circles whether user 1 is available to engage in a communications session 340. The availability of user 1 is communicated to selected friends. In some instances, availability indication 1651 indicates that user 1 is not currently available for a communications session. Other times, availability indication 1651 indicates that user 1 is currently available for a communications session. In some embodiments, availability indication 1651 is only present in GUI 165 when user 1 enables it. In some embodiments, availability indication 1651 is only displayed when the communications session is ambient and not when user 1 is engaged in the communications session. Availability indication 1651 may be a graphical icon or shape, such as a small circle, whose visual properties change between user 1 being available and being unavailable. For example, availability indication 1651 may be a shape that is red when user 1 is unavailable to hangout and green when user 1 is available to hangout. Alternatively, availability indication 1651 is not present, regardless of whether an ambient communications session has been initiated.

In some embodiments, user 1 interacts with a social media application, such as web-based application 120 supported by an Internet browser application, where a list of user 1's contacts is provided, such as in a list of icons or thumb images. Each friend may be associated with an indication similar to availability indication 1651 that informs user 1 if the friend is available for or desires to engage in a hangout session. If the friend is available to hangout in a communications session 340, the indication includes an attribute informing the user that the friend is online and available to hangout. If the friend is offline or otherwise unavailable, an attribute of the indication informs the user that the friend is unavailable. In some embodiments, user 1 is able to see information of other users who are not in a friend list of user 1. Alternatively, a friend only shows up on the list if the friend is either available or online.

User 1 may toggle or select button 1652 in order to indicate that user 1 is available or unavailable for a communications session 340. Availability indication 1651 is then displayed on output device 160, or availability indication 1651 changes to reflect availability of user 1. In contrast, if user 1 was previously available and toggles button 1652, availability indication 1651 shows that user 11 is unavailable. Toggling or selecting button 1652 causes communications client 140 to issue a signal indicating to other computing devices that user 1 is available to participate in a communications session. In some instances, the signal is broadcasted to a circle of contacts of user 1, for example, by first sending the signaling to a centralized management application (i.e., the contact center manager as described further below) that keeps track of the states of users. In other instances, the centralized management application may keep track of customer and agent states and make determinations with respect to connecting a suitable agent to a hangout where a customer is waiting or connecting a customer to a hangout where a suitable agent is waiting.

As described, user 1 may be using application(s) 120 while communication module 140 operates an ambient hangout in the background of the client device 100. When the hangout session initiated by user 1 is an ambient hangout, he is not active in the hangout. As soon as a second user enters the hangout, the communications session 340 supporting the hangout provides full functionality to the hangout session and it ceases to be an ambient hangout. In other examples, the hangout is ambient only if user 1 is not currently participating in the hangout.

Figure 4:
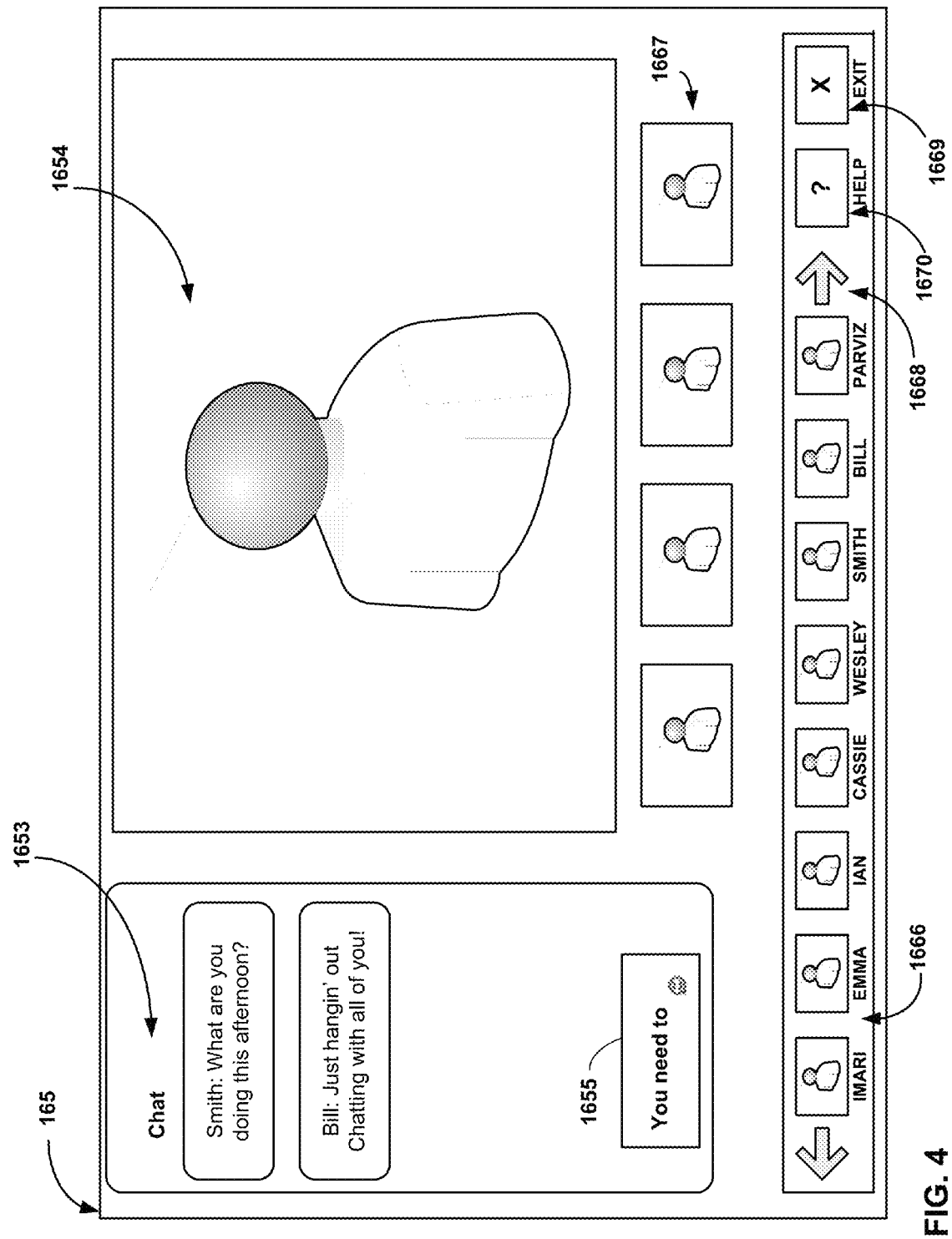
FIG. 4 is an example graphical user interface at the client machine of FIGS. 2 and 3 available to a user for the group interaction experience.

The graphical user interface (GUI) of FIG. 4 is an example of the GUI 165 of client device 100 of FIGS. 1 and 3. However, the graphical display of FIG. 4 may be outputted using other devices. A client application supporting hangout sessions is typically contained within an internet browser session. The application exposes a number of features to the user through the GUI. These graphically displayed features include a video display 1654 of one or more participants in the hangout. A chat feature 1653 is also provided, including a chat history and a field 1655 where a user can, such as user 1, input text to the chat conversation. GUI 165 is also configured to display graphical images 1667 that are associated with participants in the hangout. Graphical images 1667 include images of users currently participating in the hangout.

In the example GUI 165, a live bar 1666 provides information to user 1, including information describing the availability of friends or other users or contacts to join the hangout. In one embodiment, live bar 1666 is a scrollable bar that displays graphical images associated with contacts or other users who may be currently available to hang out in a communications session. Selection of one of the graphical images sends an invitation to join the hangout to the user associated with that image. In some embodiments, live bar 1666 is updated in real-time to reflect actual availability of the users displayed. The users displayed on live bar 1666 may be displayed as graphical still photos (for example, icons) or with a live video feed if the user has a camera enabled. The example GUI 165 includes additional a user selectable button 1669, which functions to toggle live bar 1666 between being displayed and hidden. Buttons 1668 allows the user to scroll through the different users.

Figure 5:
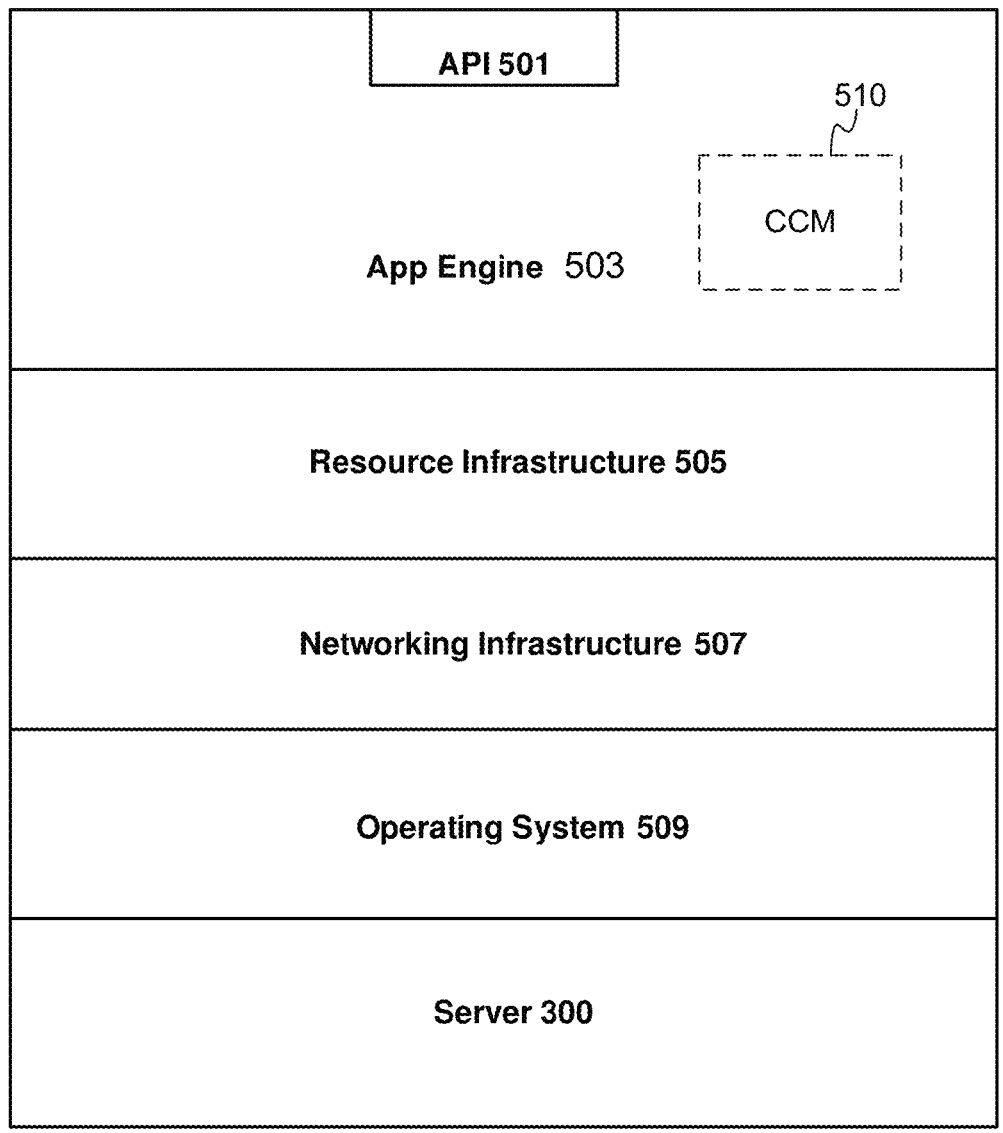
FIG. 5 is a block diagram of the server in FIG. 1, illustrating example executable components supporting the multimedia production environment and interaction among the client machines through their respect graphical user interfaces.

Referring to FIG. 5, in one embodiment, an application programming interface (API) 501 of an Application Engine or App Engine 503 provides many resources to the communications session 340 (e.g., a hangout session). In turn, the App Engine 503 depends on resources provided from an API exposed by a Resource Infrastructure Layer 505 and a Networking Infrastructure Layer 507, which are supported by the communications servers 320 and their Operating Systems 509. The App Engine 503 and the Resource Infrastructure Layer 505 connect HTTP requests from the user to the communications sessions 340. The App Engine 503 also provides a runtime environment for the communications sessions 340. Administrative support for the communications sessions 340 are provided by a Contact Center Manager (CCM) 510 in the App Engine 503 as described in greater detail hereafter in connection with FIG. 6. The App Engine 503 also provides access to a database in the Resource Infrastructure Layer 505 for persistent storage requirements of the communications sessions 340. It will be appreciated that applications such as the CCM 510 running on the App Engine 503 include computer-executable instructions that are stored on a tangible, non-transitory computer-readable medium, for example, at a communications server 320 and executed by a processor. It will be further appreciated that various components may be integrated into a single platform while maintaining their individual functionality and identity. Such a platform may be supported by a single server or by several servers. Moreover, the servers may be embodied in a single physical machine or several physical machines.

Through its API 501, the App Engine 503 provides the communications sessions 340 access to resources on the Internet, such as web services or other data. The App Engine 503 retrieves web resources using the Resource Infrastructure Layer 505. The communications session 340 also sends and receives messages using the App Engine 503 and the Resource Infrastructure Layer 505. The App Engine 503 and the Resource Infrastructure Layer 505 also supports a cache, which is useful for temporary data or data copied from the datastore to the cache for high speed access. The Resource Infrastructure Layer 505 also supports a file system and scheduling resources. An example of the App Engine includes Google's App Engine. An example of the Resource Infrastructure Layer 505, the Networking Infrastructure Layer 507 and the Operating System 509 is Google's supporting infrastructure and operating system for its App Engine. Additionally, the communications session 340 may include an API that controls and receives events into and out of the communications session 340. For example, the API of the communications session 340 may allow other applications to be brought into the communications session 340, as well as communicating agent and customer state changes during the communications session 340.

Figure 6:
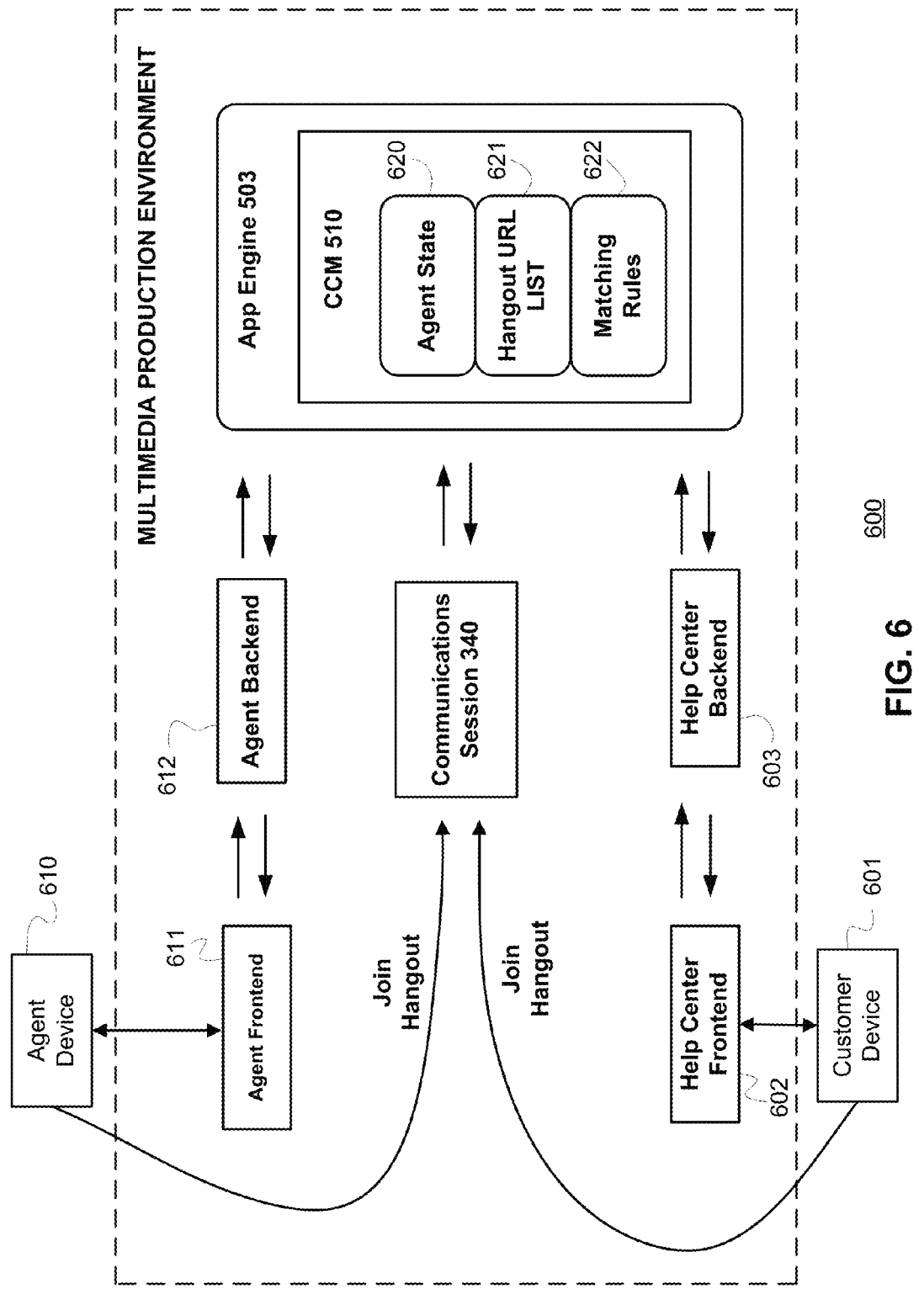
FIG. 6 is a functional block diagram illustrating a system and method of managing agents for servicing help requests initiated by users in a multimedia production environment.

Given the context of the example multimedia production environment described in FIGS. 1-5, the provision of agent support services within such a multimedia production environment according to exemplary embodiments is discussed in further detail with respect to FIG. 6. A customer device 601 connects to the multimedia production environment through a help center frontend 602. In one exemplary embodiment, when the customer device 601 is a device connected to the Internet (or other network connected to the multimedia production environment) with a browser, the help center frontend 602 includes a landing page website displayed to the user hosted by a web server (e.g., a customer support site). The help center backend 603 may include application servers that communicate with the App Engine 503 of the multimedia production environment in order to route the customer device 601 to an appropriate communications session 340 (or "hangout"). The help center frontend 602 and help center backend 603 make up a help center interface that acts as an intermediary between the customer device 601 and the CCM 510 running on the App Engine 503.

In one exemplary embodiment, the landing page of the help center frontend 602 simply includes an option to request customer support (e.g., such as a button that acts as a link to join a communications session 340 with an agent when an agent becomes available). In other exemplary embodiments, the landing page of the help center frontend 602 includes an interactive interface through which the customer can specify the nature of the customer's service request. A help request may include information of the nature of the need causing the user to make the help request. The information describing the help request may be taken from a template presented to a user when a help request is initiated. The template can be a pop up window appearing after the help request is made or it can be a drop down menu enabled when the help request is initiated. Any sort of structured entry of attributes of the help request that complements the information used by the matching rules module 622 of the CCM 510 (described in further detail below) may be appropriate for the user interface at the customer device 601. For example, the landing page may provide a list of common problem categories and allow the customer to choose or specify one or more relevant categories, and may further include a text input box where the customer can include a typed description of the service request before relaying the request to the help center backend 603. Additionally, information related to a customer may be determined based on the customer having previously authenticated himself or herself (e.g., by logging in) or based on a customer number. For example, if a customer logs into the landing page, the help center backend 603 can do a data lookup to determine information including but not limited to the identity of the customer, what products the customer is using, any history of help requests, and whether the customer is a high value or new customer.

In another exemplary embodiment, when the customer device 601 is a conventional phone client, the help center frontend 602 and help center backend 603 may be part of an integration infrastructure that converts the audio content of the conventional phone client to content that is compatible with the multimedia production environment (e.g., into VoIP format), and interfaces with the App Engine 503 of the multimedia production environment in order to route the customer device 601 to an appropriate communications session 340. It will be appreciated that customers connecting to the help center frontend 602 from conventional phone clients may also specify a service request category and provide a short description of their service request, for example, through an Interactive Voice Response (IVR) system that screens the incoming service request call before sending the information onto the App Engine 503 to match the call with an agent in the multimedia production environment.

In another exemplary embodiment, the customer device 601 may already be part of an ongoing communications session 340 when the customer device 601 requests customer support. For example, within the GUI of the communications session 340, there may be a help button 1670 included that allows a customer to request customer assistance (see FIG. 4). When that button is pressed by a customer, an agent may be brought into the ongoing communications session 340 when available. Alternatively, pressing the help button 1670 may result in the customer joining a new virtual hangout (as if the customer had entered through a landing page as described above). In still another alternative example, pressing the help button 1670 may open a customer support landing page in a browser, allowing the customer to specify details regarding the nature of the customer's service request as described above.

When the customer device 601 requests assistance from the help center frontend 602, the help center frontend 602 relays this request to the help center backend 603, which then communicates with the CCM 510 of the App Engine 503 to determine if an agent is available. The CCM 510 receives information from ongoing communications sessions 340 through an application programming interface (API), which the CCM 510 uses to manage assignment of support resources to the hangout session when a help request is created. Upon initiation of a communications session 340, whether by a user or agent, the CCM 510 monitors information pertaining to the communications session 340 through the API such as an identification number of the hangout, the hangout URL (i.e., a "session address") corresponding to a virtual location for the hangout, a topic of the hangout if appropriate, a name of the hangout and similar types of attributes that may be useful to technical support agents or to the CCM's management of the agent resources in response to a help request for any given hangout session. The hangout sessions may be initiated for the sole purpose of providing a forum for an interaction between a user of hangouts and an agent in order to assist the user for a technical issue. Alternatively, an agent may join an existing hangout initiated for purposes of social interaction independent of the technical support requested from the help request.

The CCM 510 includes modules for managing agent resources. A few example modules for managing agent resources are depicted in FIG. 6. An agent state module 620 includes a list of all agents and data identifying the state of the agent (e.g., available or busy). A hangout URL list module 621 includes a list of the current hangouts. For example, the hangout URL list includes a list of customers (if any) that are in communications sessions 340 that are waiting for agents, a list of agents (if any) that are in communications sessions 340 that are waiting for customers, and a list of ongoing communications sessions 340 with one or more customers and agents participating. The hangout URL list may further include a list of all ongoing communications sessions 340 generally, any one of which may generate a help request during the hangout session in response to a customer selecting the help button 1670.

The CCM 510 further includes a matching rules module 622 that includes any number of rules for matching customer support requests with suitable agents. For example, the matching rules module 622 can include an agent skill mapping that indicates (or "maps") which agents have skills or expertise that are suitable for addressing certain categories of service requests that may be designated by the customers on the landing page of the help center frontend 602 as described above. The agent skill mapping can be a simple agent-to-expertise mapping or can be a more sophisticated tiered mapping that includes different levels of expertise and different rankings. For a more sophisticated tiered mapping, the matching algorithm may, for example, take into account an agents' rank and primary or secondary levels or expertise to match an agent with a particular customer support request. Another example would be to match customers with agents based on time-of-day considerations, or based on how long certain customers and agents have been waiting for a match. It will be appreciated that the aforementioned rules are only intended to be examples of a wide variety of rules that could be implemented. For example, other rules could include algorithms such as time-dependent relaxation of matching criteria (i.e., as a customer or agent waits longer and longer, the criteria for matching them to a suitable party becomes looser and looser), or be based on user-specific characteristics (e.g., allowing premium users to jump ahead of a customer queue or giving low priority to blacklisted users).

Upon receiving a service request, if a suitable agent is available (i.e., there is an agent waiting in an existing communications session 340) according to the CCM 510, the App Engine 503 sends an existing hangout URL back to the help center backend 603 which relays the URL to the help center frontend 602. The help center frontend 602 then facilitates the joining of the hangout (i.e., communications session 340) by the customer device 601. If no suitable agent is available at the time of the request according to the CCM 510, the App Engine 503 sends a new hangout URL back to the help center backend 603 which relays the new URL to the help center frontend 602. The customer device 601 joins a communications session 340 based on the new hangout URL, and when a suitable agent becomes available according to the CCM 510, the suitable agent is joined to the communications session 340. As described above, information pertaining to ongoing communications sessions 340, including ambient communications sessions 340 with only one party connected, is monitored by the CCM 510 and stored in the hangout URL list module 621.

In a further embodiment, the agent is given the opportunity to review the details of the service request via the agent frontend 611 and decide whether to join in a particular communications session 340. For example, if the agent is determined to be suitable and available based on the agent state module 620 and matching rules module 622 of the CCM 510, but upon reading the description of the customer's service request the agent realizes that the agent would be unable to help with that request or knows of another agent more suitable for that request, the agent can decline to join in the communications session 340 and may further indicate another type of agent or specific agent that may be better suited to help. The matching rules would then take this into account in searching for a new agent to match with the customer waiting in that particular communications session 340.

An agent participates in the aforementioned customer support communications sessions 340 by connecting to the multimedia production environment through an agent frontend 611. For example, when an agent initially connects to the multimedia production environment or finishes a communications session 340 with a customer, the agent may connect to an agent frontend 611 via an agent device 610. The agent device 610 is preferably a computing device capable of utilizing all of the functionality of the multimedia production environment (e.g., audio and video communication using VoIP). Information corresponding to agents (such as expertise, work schedules, and availability) is stored in the App Engine 503 and may be associated with an agent for example based on the agent connecting to the agent frontend 611 through a log-in page. Agent availability is provided to the CCM 510 from the agent backend 612 through the API and the CCM 510 updates the Agent State module accordingly. During the agent's work day, his or her status toggles between available and busy. This status is continuously updated at the CCM 510 by way of the API between the agent backend 612 and the CCM 510. An agent may also use the agent frontend 611 to input agent skill map information that will be relayed to the CCM 510 by the agent backend 612 and stored in the matching rules module 622 of the CCM 510.

The agent frontend 611, together with the agent backend 612 and App Engine 503, serves to route an agent to an appropriate communications session 340. The agent frontend 611 and agent backend 612 make up an agent interface that acts as an intermediary between the agent device 610 and the CCM 510 running on the App Engine 503. For example, if an agent begins his or her working shift and logs into the system, the agent may first access a landing page for agents that shows information such as pending customer support requests corresponding to ongoing ambient communications sessions 340 where customers are waiting, along with information pertaining to those service requests (e.g., type of help needed, amount of time pending). In one example embodiment, the agent frontend 611 may require the agent to join the communications session 340 that the CCM 510 has deemed most appropriate by providing the corresponding hangout URL to the agent frontend 611 through the agent backend 611 and automatically connecting the agent device 610 with the communications session 340 corresponding to that hangout URL. Alternatively, if no ongoing communications sessions 340 are deemed suitable for that agent, the agent may be automatically routed, according to a new hangout URL provided by the App Engine 503, to a new communications session 340 where the agent waits for a suitable customer to be matched to that agent and routed to the communications session 340 where the agent is waiting. In another alternative embodiment, each agent has his or her own home page and can join a hangout in a manner similar to any customer. However, unlike customers, an agent is registered with the CCM 510.

In one example embodiment, once an agent becomes available, the agent is added to an ordered list maintained by the agent state module 620 of the CCM. The agent may remain in whatever communications session 340 the agent was previously in or may be assigned a new communications session 340. When a customer makes a request for assistance, the CCM 510 may match that agent with the service request and deliver the hangout URL corresponding to that agent's communications session 340 to the customer. The customer device 601 uses the information in the URL to join the agent's communications session 340. Alternatively, if the customer is also waiting in an existing communications session 340, the CCM 510 can provide the hangout URL corresponding to the customer's communications session 340 to the agent and the agent can join the customer's communications session 340.

In a further embodiment, the agent may be given the option to accept or decline being joined to ongoing communications session 340 (or reject incoming customer connections to a communications session 340 in which the agent is waiting) based on the information about the customer support request. Alternatively, the agent may be provided with a list of customer support requests to choose from at a landing page provided by the agent frontend 611 or while the agent is waiting in an ambient communications session 340. The agent can then choose to join an ongoing communications session 340 (or allow a customer device 601 to connect to the agent's ambient communications session 340) based on the information pertaining to that customer's request.

In summary, FIG. 6 depicts an example embodiment of how an agent and a customer are routed to a suitable communications session 340 based on hangout URLs provided by a CCM 510 of an App Engine 503. If a suitable match cannot be found when either the agent or the customer connect to the multimedia production environment, the agent or the customer may wait in an ambient communications session 340 until a suitable match becomes available and is added to the ambient communications session 340, turning it into an active customer support communications session 340. On the other hand, when more than one agent is available to respond to a help request, the CCM 510 uses agent information, service request information, and matching rules to match the help request to the best available agent. In any case, when a suitable match is determined by the CCM 510, the matched agent or customer is joined to a customer or agent, respectively, waiting in an existing communications session 340.

Figure 7:
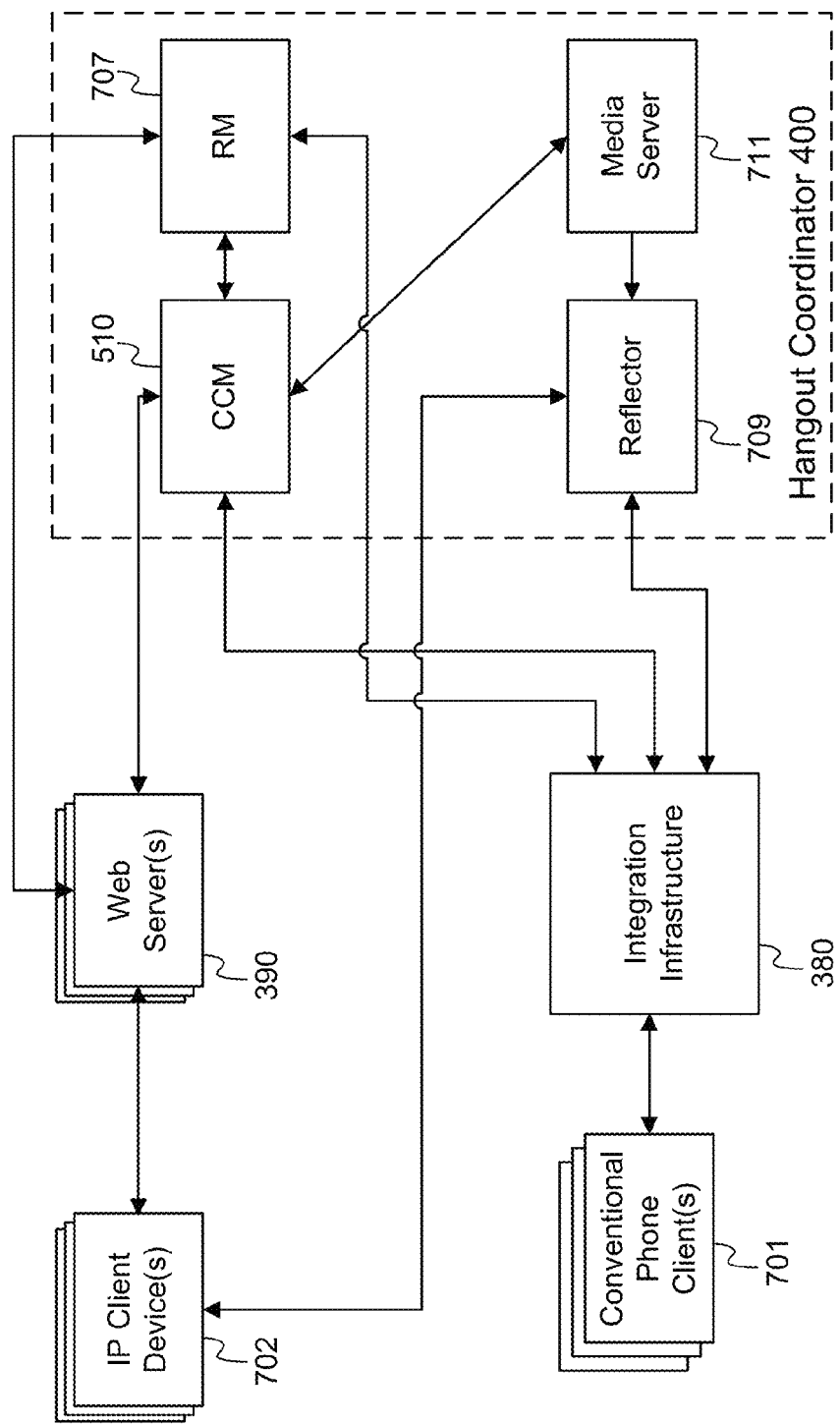
FIG. 7 is a functional block diagram illustrating an example system architecture for providing content to IP client devices and conventional phone clients connected to a multimedia production environment.

FIG. 7 is a diagram illustrating an example system architecture for providing content to customer and agent devices connected to the multimedia production environment. Generally, customers and agents use IP client devices 702 (e.g., computing devices such as personal computers and smart phones having VoIP and video playback capability). These IP client devices 702 are connected to one or more web servers 390 (and application servers which are not depicted for simplicity), which communicate with a CCM 510 and Room Manager (RM) of a hangout coordinator module 400 in the multimedia production environment in order to assign an appropriate communications session 340 to the IP client devices 702. The one or more web servers 390 and CCM 510 communicate with the RM 707 to determine whether an incoming call needs a new hangout URL or should be routed to an existing hangout URL. Based on that determination, the IP client devices 702 are connected to an appropriate reflector 709 corresponding to a communications session 340. All audio and video content from customers and agents participating in that communications session 340 is routed to the reflector 709, which processes the multimedia content for playback to each of the customers and agents as a plurality of processed multimedia streams, e.g., by buffering and synchronizing the separate multimedia content received from the customers and agents (along with any additional content received from other sources).

Additionally, customers and/or agents can request additional resources to be brought into the communications session 340. For example, it may be helpful for an agent to play an instructional streaming video to the customer to assist the customer with the customer's service request. In such case, pursuant to an agent's request, the CCM 510 can communicate with a media server 711 to send that streaming video content to the reflector 709 for playback to the customer's IP client device 702. Utilizing this architecture, the agent can further provide commentary while the streaming video is playing to help the customer better understand the streaming video. Other resources that could be requested to be brought into the communications session 340 include without limitation an IVR application or a recorder that records the communications session 340.

In the case of customers using conventional phone clients 701 to request customer support, such conventional phone client calls can be integrated into the multimedia production environment through integration infrastructure 380. This integration infrastructure 380, for example, can include a bridge system with appropriate gateways and soft switch applications for conversion of call signals to an IP-compatible format such as VoIP. The multimedia content provided through the reflector will also have to pass through the integration infrastructure 380 and converted into an audio format compatible with the conventional phone client 701. Although conventional phone clients 701 will be unable to utilize certain functionality of the multimedia production environment (e.g., streaming video), these conventional phone clients 701 can still advantageously be assigned to communications sessions 340 and matched with agents in a manner that is similar to customers using IP client devices 702.

Figure 8:
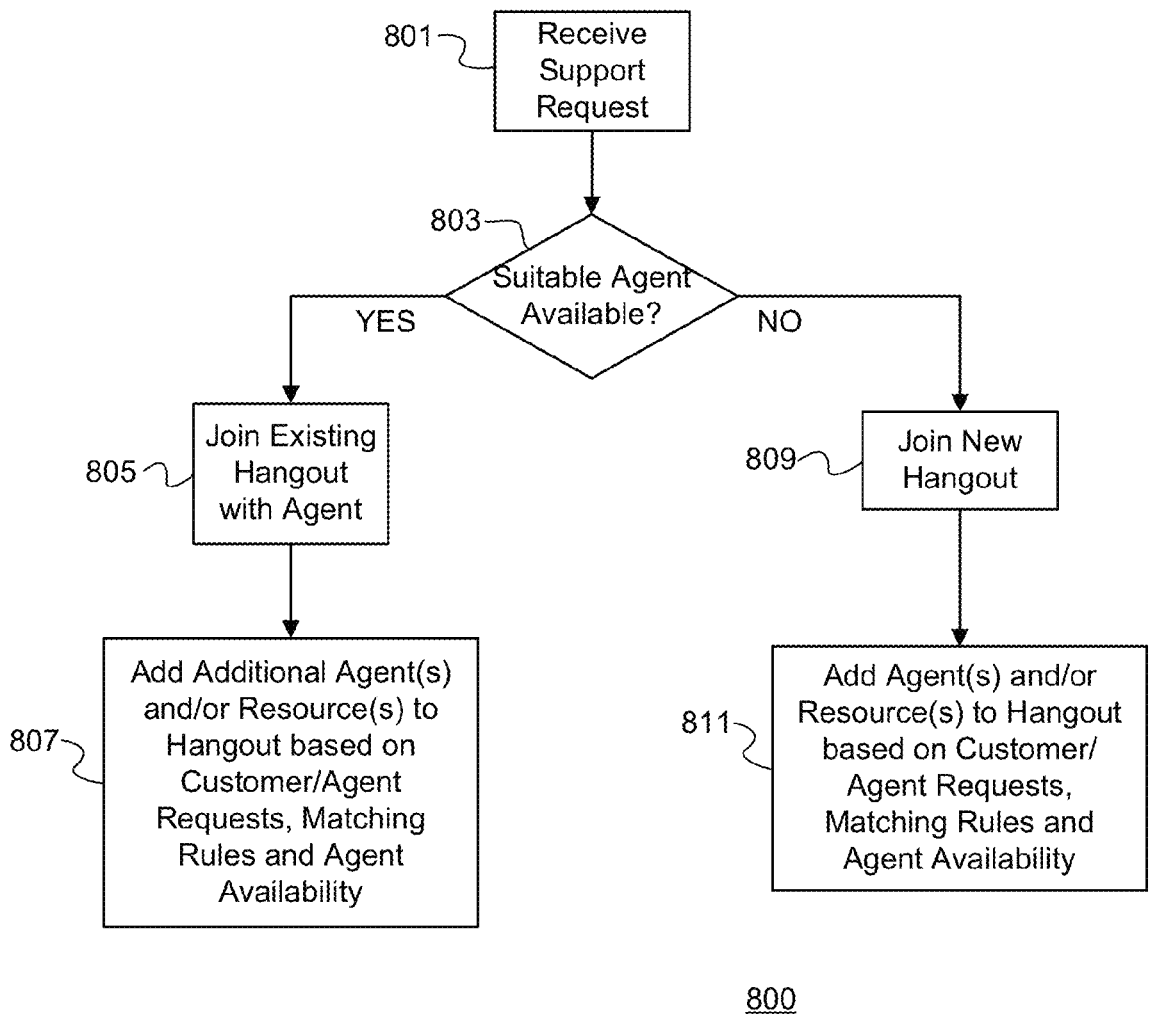
FIG. 8 is a flowchart illustrating a process for handling an incoming customer support request in a multimedia production environment.

FIG. 8 depicts a general process 800 that illustrates how a customer support request from a customer device 601 is handled by the multimedia production environment. At stage 801, the multimedia production environment receives the customer support request, for example, through a help center frontend 602 as depicted in FIG. 6. The CCM 510 of the App Engine 503 in the multimedia production environment uses its agent state module 620, hangout URL list module 621, and matching rules module 622, to determine whether a suitable agent is available at stage 803. If the CCM 510 determines that a suitable agent is available and waiting in an existing communications session 340 based on the matching rules, the customer device 601 is provided with the corresponding hangout URL and joined that existing communications session 340 at stage 805. Once the customer device 601 has been joined to the communications session 340 and is in an active communications session with the agent, additional agents and/or resources can be added to the communications session 340 based on a customer or agent request, based on the matching rules, and/or based on agent availability.

In one example, if there are tiered matching rules where a first agent is preferable to a second agent for a particular problem but the second agent was unavailable at the time the service request was received, the first agent might have been matched with the customer. When the second agent becomes available, and no other customer requests are outstanding that require the second agent's attention, the second agent may be joined to the communications session 340 according to the matching rules in addition to the first agent to further assist the customer. In another example, the customer may request (e.g., through an appropriate button) that a supervisory agent be joined to the communications session 340, for example, if the agent currently working with the customer is doing an unsatisfactory job. In yet another example, the customer or agent can request other resources to be brought in such as streaming video (for relevant demonstrations or instructions), an IVR, or a recorder. It will be appreciated that the foregoing examples are merely example and that other sorts of matching rules, customer or agent requests, and resource types are also feasible.

At stage 803, if the CCM 510 is unable to find a suitable agent to match with a customer support request, the unmatched customer device 601 is provided with a new hangout URL at stage 809 and connected to a new communications session 340. Similar to stage 807, at stage 811, agent(s) and/or resource(s) are later added to the communications session 340. For example, when a suitable agent becomes available, the suitable agent is added to the communications session 340.

In one embodiment, an IVR may first be added to the communications session 340 in lieu of an agent while no suitable agents are available in order to assist the customer or gather preliminary information. The IVR could ask simple questions to the customer and may further cause appropriate instructional videos to be played back in the communications session 340 to the customer based on the customer's responses. Thus, the IVR may solve the customer's issue even before an agent becomes available to assist the customer. In addition, when the agent becomes available, the agent can be joined to the communications session 340 without interrupting the IVR. Alternatively, an IVR or other resources can be added to the communications session 340 while the customer is waiting to entertain the customer. For example, the customer could use the GUI of the communications session 340 to play streaming videos or listen to music while the customer waits. A selection of music and/or videos may further be provided to the customer via the communications session 340.

In an example embodiment, as the agent is providing service to the customer through the customer's client device, e.g., IP client device(s) 702, conventional phone client(s) 701, etc., the agent may utilize the agent device 610 to initiate other resources such as video response units, stored video information, audio information, web information, etc. All of the resources that are available in the communications session 340 as described in this disclosure could be utilized by the agent to provide service to the client. The multimedia client service may be free flowing and unscripted as resources are streamed to the user. In such instances, an example embodiment provides in relation to FIG. 6 that the agent provides input to the agent device 610 that generates an agent resource request indicating an agent resource that should be joined to the communications session. The agent resource request is transferred to the app engine 503 which may provide routing information for such selected agent resource to join it with the communications session 340. In another example embodiment, the hangout coordinator 400 as shown in FIG. 7 may receive such agent resource request at the CCM 510 which provides a direction to media server 711 or other resource to join the communications session and connect to the reflector 709. As further information is obtained or provided, other resources may be similarly joined.

In the example embodiments, the various applications can be configured on any distributed or embedded platform within a single location or multiple locations. For example, the CCM may be resident on an individual and separate platform or may be embedded into a server platform. Similarly, some of the resources may reside on individual and separate platforms or they may be embedded into the server or other platforms. As such, embodiments contemplate that applications, resources, managers, servers, etc. may be joined or separated without diverging from their identities and functions. For example, a "server system" may include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for providing support services via a virtual production environment, the system comprising:
   a help center interface configured for connecting to one or more customer devices and receiving customer support requests from the one or more customer devices and to communicate with a contact center manager (CCM) application;
   an agent interface connected to one or more agent devices configured to communicate agent availability information to the CCM application; and
   a communications server running in association with the CCM application, the CCM application configured to generate a jointly-accessible multimedia page with a distinct address, to provide the distinct address to the one or more customer devices and the one or more agent devices, and to match the one or more customer devices with the one or more agent devices based on the agent availability information and matching rules;
   wherein the communications server is configured to maintain the jointly-accessible multimedia page corresponding to the distinct address in the virtual production environment thereby providing multimedia communication at the jointly-accessible multimedia page joined between the one or more customer devices and the one or more agent devices based on the matching by the CCM application.

2. The system of claim 1, wherein the help center interface further comprises a help center frontend and a help center backend, wherein the help center frontend and the help center backend are configured to relay the customer support requests from the one or more customer devices to the CCM application and to relay the distinct address from the CCM application to the one or more customer devices.

3. The system of claim 2, wherein the help center frontend further comprises a web server configured to provide a customer support landing page to the one or more customer devices.

4. The system of claim 2, wherein a customer device of the one or more customer devices is a conventional phone client and the help center interface further comprises integration infrastructure for converting conventional call signals from the conventional phone client to an internet protocol-compatible format.

5. The system of claim 1, wherein the CCM application is further configured to provide an unmatched customer device or unmatched agent device with a new distinct address so as to connect the unmatched customer device or the unmatched agent device to a new jointly-accessible multimedia page.

6. The system of claim 5, wherein the new jointly-accessible multimedia page is an ambient multimedia page until a matched customer device or a matched agent device is connected to the new jointly-accessible multimedia page.

7. The system of claim 5, wherein the CCM application is further configured to provide the new distinct address corresponding to the new jointly-accessible multimedia page to a matched customer device or a matched agent device based on a list of distinct addresses maintained by the CCM application.

8. The system of claim 1, wherein the help center interface is further configured to receive information specifying one or more customer support request categories, and the matching rules include an agent skill map that maps skills of agent to the one or more customer support request categories.

9. A system for providing support services via a multimedia production environment, the system comprising:
one or more agent devices, for communicating with a communications server using voice over internet protocol (VoIP) and sending and receiving multimedia content;
a reflector, for receiving multimedia content from the one or more agent devices and one or more customer devices, processing the received multimedia content, and sending a plurality of processed multimedia streams for playback through a jointly-accessible multimedia page to the one or more agent devices and the one or more customer devices; and
a contact center manager (CCM) application running on the communications server, the CCM application receiving customer support requests from the one or more customer devices, generating the jointly-accessible multimedia page with a distinct address, providing the distinct address to the one or more customer devices and the one or more agent devices, and matching the one or more customer devices with the one or more agent devices by joining such devices at the jointly-accessible multimedia page based on agent availability information and matching rules.

10. The system of claim 9, further comprising:
integration infrastructure for converting conventional call signals from customer devices that are conventional phone clients to an internet protocol-compatible format.

11. The system of claim 9, wherein the CCM application provides a new distinct address to an unmatched customer device or unmatched agent device so as to connect the unmatched customer device or the unmatched agent device to a new jointly-accessible multimedia page.

12. The system of claim 11, wherein the new jointly-accessible multimedia page is an ambient multimedia page until a matched customer device or a matched agent device is connected to the new jointly-accessible multimedia page.

13. The system of claim 11, wherein the CCM application provides the new distinct address corresponding to the new jointly-accessible multimedia page to a matched customer device or a matched agent device based on a list of distinct addresses maintained by the CCM application.

14. The system of claim 9, wherein the customer support requests further includes information specifying one or more customer support request categories, and the matching rules include an agent skill map that maps skills of agent to the one or more customer support request categories.

15. A method for receiving support services via a virtual production environment including a contact center manager application, the method performed at a customer device and comprising:
transmitting a customer support request to the contact center manager application, wherein a determination of whether a suitable agent is available is made by the contact center manager application based on customer support request information, agent availability information, and matching rules; and
connecting to a jointly-accessible multimedia page in the virtual production environment corresponding to a distinct address provided by the contact center manager application for the customer device based on the determination, the customer device joining with the suitable agent at the jointly-accessible multimedia page and multimedia communicating through such page.

16. The method of claim 15, wherein if a suitable agent is determined to be available, the provided distinct address is further based on a list of addresses maintained by the contact center manager application.

17. The method of claim 15, wherein an agent determined to be suitable is already connected to the jointly-accessible multimedia page that the customer device is connected to based on the provided distinct address.

18. The method of claim 15, wherein if a suitable agent is determined not to be available, the distinct address provided for the customer device corresponds to a new jointly-accessible multimedia page.

19. The method of claim 18, wherein the new jointly-accessible multimedia page is an ambient multimedia page until a matched customer device or a matched agent device is connected to the new jointly-accessible multimedia page thereby establishing a multimedia communication between the matched customer device and the matched agent device.

20. The method of claim 15, wherein the customer support request further includes information specifying one or more customer support request categories, and the matching rules include an agent skill map that maps skills of agents to the one or more customer support request categories.

* * * * *